US012246996B2

(12) United States Patent
Hultine et al.

(10) Patent No.: US 12,246,996 B2
(45) Date of Patent: Mar. 11, 2025

(54) RECYCLING REDUCED-CARBON MATERIALS

(71) Applicant: THG, LLC, Milwaukie, OR (US)

(72) Inventors: J. Dustin Hultine, Milwaukie, OR (US); Robert Kurt Graupner, Hillsboro, OR (US)

(73) Assignee: THG, LLC, Milwaukie, OR (US)

( * ) Notice: Subject to any disclaimer, the term of this patent is extended or adjusted under 35 U.S.C. 154(b) by 0 days.

(21) Appl. No.: 18/533,794

(22) Filed: Dec. 8, 2023

(65) Prior Publication Data

US 2024/0190784 A1  Jun. 13, 2024

Related U.S. Application Data

(60) Provisional application No. 63/386,807, filed on Dec. 9, 2022.

(51) Int. Cl.
*C05C 9/00* (2006.01)
*C05B 11/06* (2006.01)
*C05C 3/00* (2006.01)

(52) U.S. Cl.
CPC .............. *C05C 9/00* (2013.01); *C05B 11/06* (2013.01); *C05C 3/00* (2013.01)

(58) Field of Classification Search
CPC ... C07C 277/02; C07C 277/00; C07C 273/02; C07C 279/28; C01B 2203/0283;

(Continued)

(56) References Cited

U.S. PATENT DOCUMENTS 2,134,013 A   10/1938  Turrentine
3,005,697 A * 10/1961  Mcknight .............. C05B 11/06
                                                      422/209

(Continued)

FOREIGN PATENT DOCUMENTS

EP   3325196 B1   9/2020
JP   4691282 B2   6/2011

(Continued)

OTHER PUBLICATIONS

DBpedia. "About: Boudouard reaction"., <https://dbpedia.org/page/Boudouard_reaction> Dec. 18, 2017 (Year: 2017).*

(Continued)

*Primary Examiner* — Jennifer A Smith
(74) *Attorney, Agent, or Firm* — Alleman Hall & Tuttle LLP

(57) ABSTRACT

An energy-releasing process for making fertilizer by consumption of a charable, reduced carbon source. The process comprises: (a) combining the carbon source with an oxide of an active metal to form a feedstock for high-temperature processing; (b) heating the feedstock in a furnace to yield an effluent gas entraining a carbide of the active metal; (c) cooling the effluent gas entraining the carbide of the active metal; (d) introducing nitrogen into the cooled effluent gas entraining the carbide of the active metal, to yield a cyanamide of the active metal and elemental carbon; (e) acidically hydrolyzing the cyanamide of the active metal to yield a cyanamide compound and a salt of the active metal; and (f) processing the cyanamide compound to yield an N-type fertilizer.

16 Claims, 8 Drawing Sheets

(58) Field of Classification Search
CPC ........... C01B 3/12; C01B 32/05; C01C 3/002; C01C 3/16; C01C 3/18; C07D 251/58; C05C 9/00; C10L 1/00; C10L 2290/00; C10L 2290/24; C10L 2290/54; Y02P 20/50

See application file for complete search history.

(56) References Cited

U.S. PATENT DOCUMENTS

| | | | |
|---|---|---|---|
| 5,707,419 | A | 1/1998 | Tsantrizos et al. |
| 7,024,800 | B2 | 4/2006 | Gorbell et al. |
| 11,180,371 | B2 | 11/2021 | Hultine et al. |
| 11,591,533 | B1 | 2/2023 | Hultine et al. |
| 2016/0304788 | A1* | 10/2016 | Sorensen ............. C10G 29/205 |
| 2019/0248711 | A1 | 8/2019 | Hazen et al. |
| 2020/0180034 | A1 | 6/2020 | Dorval Dion et al. |

FOREIGN PATENT DOCUMENTS

| | | |
|---|---|---|
| WO | 2011054113 A1 | 5/2011 |
| WO | 2012123378 A1 | 9/2012 |
| WO | 2012123380 A2 | 9/2012 |
| WO | 2016191854 A1 | 12/2016 |
| WO | 2019178668 A1 | 9/2019 |

OTHER PUBLICATIONS

Adsorption, Wikipedia Website, Available Online at en.wikipedia.org/wiki/Adsorption, Website Available as Early as Apr. 8, 2003, 18 pages.

"Water Gas Shift & Hydrogen Production," National Energy Technology Laboratory, Available Online at netl.doe.gov/research/coal/energy-systems/gasification/gasifipedia/water-gas-shift, Retrieved on Dec. 11, 2023, 3 pages.

Borella, M. et al., "A Study of the Pyrolysis Products of Kraft Lignin," Energies, vol. 15, No. 3, Jan. 28, 2022, 15 pages.

AP&C: a GE Additive Company, AP&C Website, Available Online at www.advancedpowders.com/, Retrieved on Dec. 11, 2023, 7 pages.

Aquatic Species Program, Wikipedia Website, Available Online at en.wikipedia.org/wiki/Aquatic_Species_Program, Website Available as Early as Mar. 31, 2006, 6 pages.

Boudouard reaction, Wikipedia Website, Available Online at en.wikipedia.org/wiki/Boudouard_reaction, Website Available as Early as Nov. 18, 2005, 3 pages.

Gaud, W., "Fire Effect on Soil," Northern Arizona University, Available Online at www2.nau.edu/~gaud/bio300w/frsl.htm, Retrieved on Dec. 11, 2023, 4 pages.

Ellingham diagram, Wikipedia Website, Available Online at en.wikipedia.org/wiki/Ellingham_diagram, Website Available as Early as Jan. 16, 2006, 3 pages.

Chen, W. et al., "Mechanism of Carbon Monoxide Dissociation on a Cobalt Fischer-Tropsch Catalyst," ChemCatChem, vol. 10, No. 1, Aug. 17, 2017, 5 pages.

Fuel cell, Wikipedia Website, Available Online at en.wikipedia.org/wiki/Fuel_cell, Website Available as Early as Jan. 11, 2002, 33 pages.

Min, D. et al., "The Structure of Lignin of Corn Stover and its Changes Induced by Mild Sodium Hydroxide Treatment," BioResources, vol. 9, No. 2, Mar. 17, 2014, 10 pages.

Kawamoto, H., "Lignin pyrolysis reactions," Journal of Wood Science, vol. 63, Jan. 17, 2017, 16 pages.

Global Industry Classification Standard, Wikipedia Website, Available Online at en.wikipedia.org/wiki/Global_Industry_Classification_Standard, Website Available as Early as Jul. 8, 2005, 9 pages.

Jasinksi, S., "Mineral Resource of the Month: Phosphate Rock," Earth Magazine, Available Online at www.earthmagazine.org/article/mineral-resource-month-phosphate-rock/, Jan. 28, 2015, 2 pages.

Our production Technology, AP&C Website, Available Online at www.advancedpowders.com/powders-every-technology, Retrieved on Dec. 11, 2023, 4 pages.

Nitrophosphate process, Wikipedia Website, Available Online at en.wikipedia.org/wiki/Nitrophosphate_process, Website Available as Early as Jun. 30, 2004, 2 pages.

Valdez Salas, B. et al., "Chapter 4: Phosphoric Acid Industry: Problems and Solutions," Phosphoric Acid Industry: Problems and Solutions, Jul. 12, 2017, p. 83-p. 99.

Proton-exchange membrane fuel cell, Wikipedia Website, Available Online at en.wikipedia.org/wiki/Proton-exchange_membrane_fuel_cell, Website Available as Early as Oct. 8, 2004, 18 pages.

"Nitric Acid," STAMICARBON, Available Online at www.stamicarbon.com/nitric-acid, Retrieved on Dec. 11, 2023, 16 pages.

Pyrophoricity, Wikipedia Website, Available Online at en.wikipedia.org/wiki/Proton-exchange_membrane_fuel_cell, Website Available as Early as Feb. 26, 2003, 3 pages.

Sorption enhanced water gas shift, Wikipedia Website, Available Online at en.wikipedia.org/wiki/Sorption_enhanced_water_gas_shift, Website Available as Early as Jun. 14, 2021, 6 pages.

"History," STAMICARBON, Available Online at www.stamicarbon.com/about-us/history, Retrieved on Dec. 11, 2023, 7 pages.

"Advanced plasma atomization process: How powder is made for additive manufacturing," YouTube Website, Available Online at www.youtube.com/watch?v=vouCR6bhCt0, Mar. 4, 2020, 1 page.

Vela-Mendoza, A., "Biodiesel from Algae Oil," MicrobeWiki, Available Online at microbewiki.kenyon.edu/index.php/Biodiesel_from_Algae_Oil, Available as Early As Apr. 24, 2011, 10 pages.

Syngas, Wikipedia Website, Available Online at en.wikipedia.org/wiki/Syngas, Website Available as Early as Mar. 26, 2003, 5 pages.

"Yara grows knowledge to responsibly feed the world and protect the planet," Yara United States, Available Online at www.yara.us/about-yara/, Retrieved on Dec. 11, 2023, 3 pages.

Yara International, Wikipedia Website, Available Online at en.wikipedia.org/wiki/Yara_International, Website Available as Early as Dec. 18, 2004, 12 pages.

Algae fuel, Wikipedia Website, Available Online at en.wikipedia.org/wiki/Algae_fuel, Website Available as Early as Nov. 12, 2007, 30 pages.

ISA United States Patent and Trademark Office, International Search Report and Written Opinion Issued in Application No. PCT/US2023/083105, Feb. 16, 2024, WIPO, 11 pages.

Helling, R.K. et al., "Oxidation of Simple Compounds and Mixtures in Supercritical Water: Carbon Monoxide, Ammonia, and Ethanol," Environmental Science & Technology, vol. 22, No. 11, Nov. 1, 1988, 6 pages.

* cited by examiner

RECYCLING REDUCED-CARBON MATERIALS

CROSS REFERENCE TO RELATED APPLICATIONS

This application claims priority to U.S. Provisional Patent Application Ser. No. 63/386,807, filed Dec. 9, 2022, the entirety of which is hereby incorporated herein by reference for all purposes.

TECHNICAL FIELD

This disclosure relates generally to the field of chemical engineering and more specifically to recycling reduced-carbon materials.

SUMMARY

One aspect of this disclosure is directed to an energy-releasing process for making fertilizer by consumption of a charable, reduced carbon source. As an example, the process comprises: (a) combining the carbon source with an oxide of an active metal to form a feedstock for high-temperature processing; (b) heating the feedstock in a furnace to yield an effluent gas entraining a carbide of the active metal; (c) cooling the effluent gas entraining the carbide of the active metal; (d) introducing nitrogen into the cooled effluent gas entraining the carbide of the active metal, to yield a cyanamide of the active metal and elemental carbon; (e) acidically hydrolyzing the cyanamide of the active metal to yield a cyanamide compound and a salt of the active metal; and (f) processing the cyanamide compound to yield an N-type fertilizer.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

I

Figure 1:
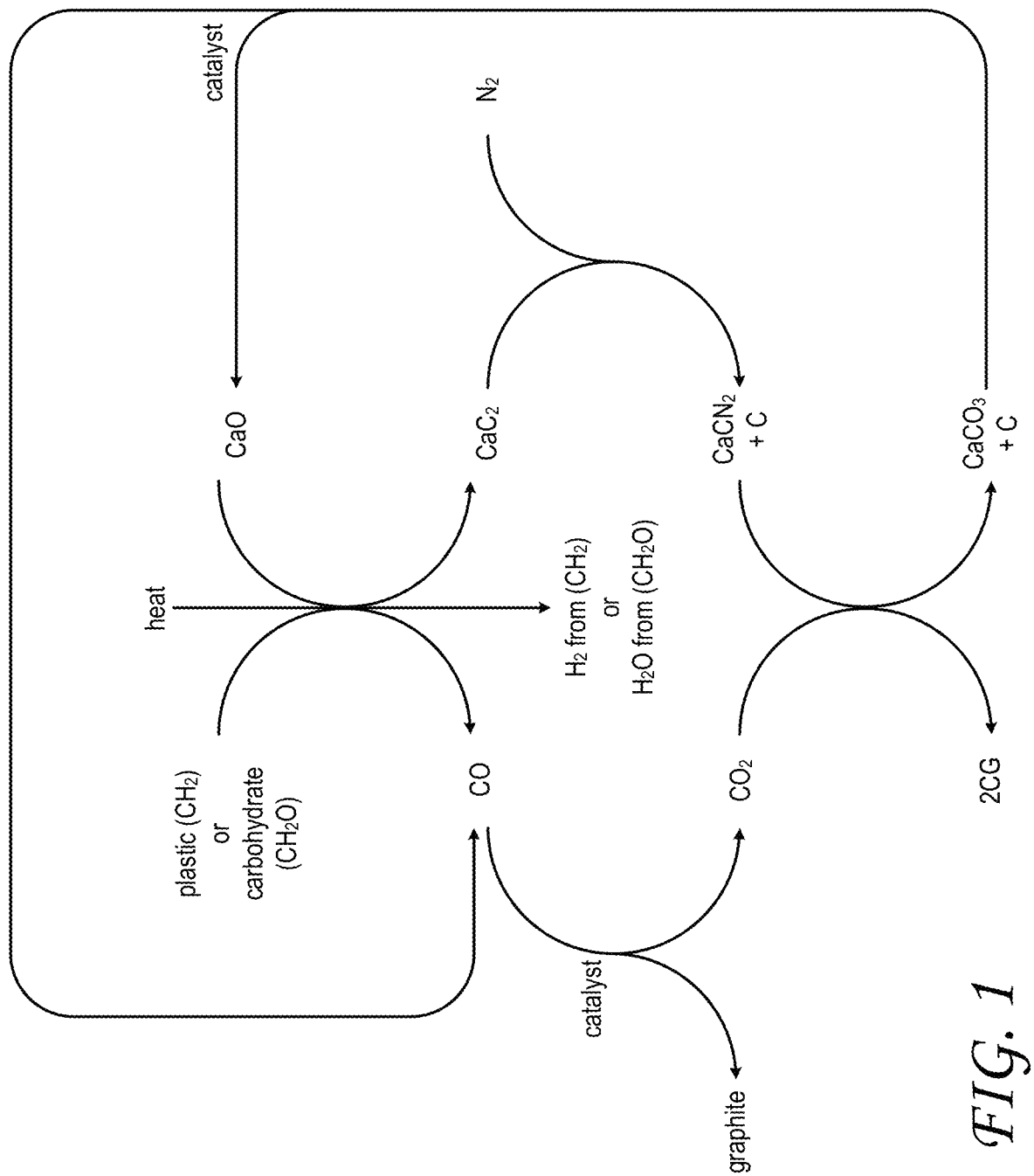
FIG. 1 shows aspects of a reaction scheme for recycling reduced-carbon materials.

This disclosure presents technology for recycling certain kinds of agricultural, industrial, and consumer wastes and for integrating the recycled products, including energy, into environmentally sustainable industrial solutions. The wastes relevant to this disclosure contain carbon; the carbon is used to convert an active-metal oxide (e.g., lime, CaO) into a corresponding carbide (e.g., $CaC_2$). Formed at high temperatures in an electric-arc furnace, active-metal carbides are valuable, high-energy chemical synthons.

In state-of-the-art carbide synthesis, amorphous elemental carbon (e.g., coke) is the carbon source, $$CaO + 3C \rightarrow CaC_2 + CO. \quad (1)$$

The inventors herein have discovered that certain other carbon sources, including waste products, can be used in place of coke. Various carbon-containing materials pyrolyze at high temperatures to yield carbon char and one or more volatile by-products. The carbon char supports carbide formation, while the volatile by-products are discharged from the furnace as gaseous effluent, along with the CO from eq 1. In examples in which the carbon-containing material is a carbohydrate, water is released into the effluent—e.g., $$CaO + 3/n(CH_2O)_n \rightarrow CaC_2 + CO + H_2O. \quad (2)$$

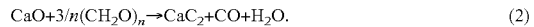

Example carbohydrate wastes suitable for recycling in this manner include agricultural wastes such as chaff and stover from grain crops, straw, bedding, and/or other agricultural/silvicultural plant material. To limit undesired cooling of the furnace by emission of steam, the carbohydrate waste may be dried and/or dehydrated upstream of the furnace. In some examples, carbohydrate waste may be dehydrated at 200 to 400° C. In some examples, the dehydration conditions may liberate volatiles such as hydrogen sulfide ($H_2S$) from the waste. The $H_2S$ can be separated from the water vapor and its sulfur and/or hydrogen content recovered.

Another carbon-containing waste material suitable for recycling is lignin, which, in view of its empirical formula, may function in the furnace as a partially dehydrated carbohydrate. Other suitable carbon-containing materials—consumer wastes such as waste plastic, motor-vehicle tires, and asphaltic shingles—comprise much more hydrogen than oxygen. In examples in which the carbon-containing material is waste plastic, hydrogen is released in the effluent—e.g., $$CaO + 3/n(CH_2)_n \rightarrow CaC_2 + CO + H_2. \quad (3)$$

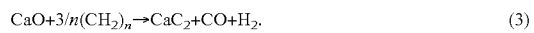

In these and other examples, both the carbide residue and the gaseous effluent have value. Historically, carbides are important agents for fixing atmospheric nitrogen. In particular, $CaC_2$ is converted into calcium cyanamide ($CaCN_2$) via the Frank-Caro process, $$CaC_2 + N_2 \rightarrow CaCN_2 + 2C. \quad (4)$$

$CaCN_2$ is readily hydrolyzed to yield organic products and salts that permit recovery of the lime starting material—e.g., $$CaCN_2 + H_2CO_3 \rightarrow CaCO_3 + H_2CN_2. \quad (5)$$

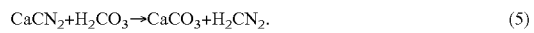

The cyanamide intermediate $H_2CN_2$ dimerizes under basic conditions to yield 2-cyanoguanidine (2-CG), $$2H_2CN_2 \rightarrow 2\text{-CG} + H^+, \quad (6)$$

which can be dimerized again to form melamine. Cyanamide itself can be hydrolyzed to yield ammonia, $$CaCN_2 + 3H_2O \rightarrow CaCO_3 + 2NH_3, \quad (7)$$

or, urea under controlled conditions, $$CaCN_2 + H_2O + CO_2 \rightarrow CaCO_3 + H_2CN_2. \quad (8)$$

It will be noted that the conversion of $CaC_2$ into $CaCN_2$ is highly exothermic. Thus, extraction of the heat released in eq 4 may provide additional value. Such heat may be used, for instance, to decompose a light hydrocarbon to make additional hydrogen—e.g., $$2CH_4 \rightarrow CH_3CH_3 + H_2. \qquad (9)$$

Likewise, the effluent from the furnace also carries valuable, recoverable heat, which may be extracted and used in various ways in integrated processes.

The effluent from the furnace in which $CaC_2$ is made may have further value due to its reducing capacity. Mixtures comprising CO and/or hydrogen have significant free energy of combustion, which can be released in various ways (e.g., oxidation) to provide high-quality energy. In some examples the total available energy is believed to exceed the energy required to power the arc furnace in which the carbide product is formed, even excluding the significant free energy of formation of $CaC_2$ relative to CaO. $CaC_2$ is produced industrially for 509 kJ/mol. The heats of combustion of the CO and $H_2$ from eq 3 combine to 1141 kJ/mol. If that amount of heat could be converted to useful work at only 45 percent efficiency, then the process would break even energetically. With more efficient (e.g., non-thermal) energy capture, surplus energy would be available. Thus, eq 3 can be described as a way to turn waste plastic and lime into $CaC_2$ and energy.

In examples in which the effluent from the furnace comprises a significant amount of hydrogen, its free energy of combustion may be extracted via a hydrogen-air fuel cell. The efficiency of a hydrogen-air fuel cell with a combined heat power (CHP) system can be over 80 percent. In some examples, any, some, or all of the reducing capacity of the effluent may be converted into hydrogen via the water gas shift (WGS) reaction, $$CO + H_2O \rightarrow CO_2 + H_2. \qquad (10)$$

Various charable carbon sources—plastics, lignin, and forest biomass, for example—pyrolyze at suitably high temperatures to yield mixtures of CO and $H_2$ (syngas, effectively). As noted herein, the syngas can be subjected to WGS conditions to yield bio-neutral $H_2$, which can be used in various ways. One potential end-use is as a fuel source for $H_2$-powered watercraft, including large ocean-going vessels. An additional advantage of this application is that the $CO_2$ by-product of the WGS reaction is also bio-neutral. Currently the cost of electrolytic hydrogen is very high, due in part to the intrinsically high overpotential for the $O_2/H_2O$ couple. The technologies herein avoid the inefficiencies of that method while retaining bio-neutrality.

The carbon dioxide produced in eq 10 can be utilized elsewhere in the overall recycling scheme (vide infra). For instance it can be used to cool the reaction chamber for eq 4 and to limit agglomeration of the $CaC_2$ starting material or $CaCN_2$ product. At least some of the $CO_2$ may be used as a source of carbonic acid for eq 5. To further increase efficiency, waste heat from the furnace and/or eq 4 may be redirected to the WGS reactor. Sorption-enhanced WGS can also be used to further increase efficiency.

In some examples, the effluent from the arc furnace may have further value due to its carbon content. Instead of subjecting all of the CO to combustion or WGS conditions, at least some of the CO may be disproportionated via the Boudouard reaction, $$2CO \rightarrow CO_2 + C. \qquad (11)$$

Reaction conditions can be optimized such that the disproportionation yields high quality graphite in lieu of amorphous carbon.

In examples in which any, some, or all of the carbide is converted into cyanamide products, the amount of carbon available for recapture may exceed the amount carried in furnace effluent. This is because eq 4 yields two equivalents of elemental carbon for every equivalent of carbide. In typical examples, the elemental carbon by-product of eq 4 is carried along with the $CaCN_2$ through subsequent acid hydrolysis (e.g., eq 5). In examples in which carbonic acid is used for the hydrolysis, the product is an intimate mixture of calcium carbonate and amorphous carbon. An alternative to separation of the mixture is to pass superheated $CO_2$ from eq 10 through the mixture, $$CO_2 + CaCO_3 + 2C \rightarrow CaO + 4CO. \qquad (12)$$

Based on the reverse-Boudouard reaction, the conversion above regenerates the active-metal oxide starting material. The CO released in eq 12 may be combined with the furnace effluent, thereby increasing both the reducing capacity and carbon content of the effluent. The Boudouard reaction can be catalyzed in both directions using transition-metal catalysts.

In other examples, it may be desirable to separate the elemental carbon from the $CaCO_3$ and process these solids separately. For instance, solid residue comprising $CaCO_3$ and elemental carbon may be separated from aqueous cyanamide (and soluble impurities) by filtration. The $CaCO_3$ may be redissolved with high selectivity in aqueous $CO_2$ (e.g., at elevated temperature and pressure) and re-precipitated to yield purified $CaCO_3$, from which the CaO starting material can be regenerated. Only the fraction that does not dissolve in aqueous $CO_2$ may be subjected to Boudouard conversion. The mineral residue that does not dissolve in aqueous $CO_2$ may contain impurities that should not be returned to the furnace. In examples in which the initial carbon source is agricultural waste, the mineral residue may contain elements that may be returned to the soil. Aspects of the chemistry described above are summarized in FIG. 1.

The technology outlined above can be integrated together with other processing to make N-, P-, and K-type fertilizers. State-of-the-art fertilizer production is energy-intensive. Using 1998 data, the energy expenditure was 92.5% for N, 3% for P as $P_2O_5$ and 4.5% for K as $K_2O$ on a global basis. Greenhouse emissions substantially track the energy expenditure for each element.

$CaCN_2$ from eq 4 provides a direct route to N-type fertilizers, in a process that can be made energy-neutral or even release surplus energy. Example N-type fertilizers available from $CaCN_2$ include urea, ammonia, 2-CG, and melamine. It will be noted that $CO_2$ from eq 10 can be used in eq 8 to make urea. In parallel, the excess energy recaptured from the furnace effluent can go toward making P- and K-type fertilizers.

In some examples, $NH_3$ from eq 7 may be oxidized to form nitric acid ($HNO_3$), $$NH_3 + 2O_2 \rightarrow HNO_3 + H_2O. \qquad (13)$$

The $HNO_3$ can be used in the nitrophosphate (i.e., Odda) process, to convert phosphate rock into phosphoric acid ($H_3PO_4$, a P-type fertilizer). In contrast to state-of-the-art methods, the nitrophosphate process does not require $H_2SO_4$, which is expensive, and does not generate calcium sulfate as a waste product. By neutralizing the $H_3PO_4$ with additional $NH_3$, ammonium phosphate, an NP fertilizer, is obtained. By neutralizing with KOH, potassium phosphate, a KP fertilizer is obtained. Thus, the technology herein can be used to produce a complete NPK fertilizer.

II

Figure 2:
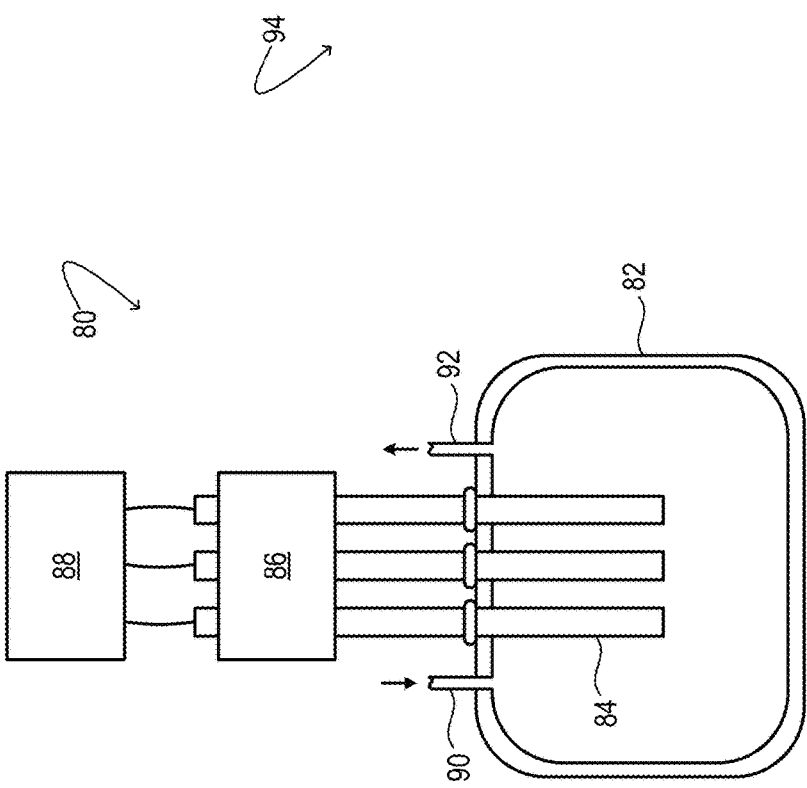
FIG. 2 shows aspects an example electric-arc furnace.

Electric-arc furnaces of various configurations can be used to make active-metal carbides according to the methods herein. FIG. 2 shows aspects of an example electric-arc furnace 80, which is similar to an arc furnace used for steel making. Furnace 80 comprises a vessel 82 of refractory material. A plurality of electrodes 84 extend into the interior of the vessel. Although three electrodes are shown in the drawing, any number of electrodes may be used. The electrodes may be raised and lowered by drive system 86. Polyphase power supply 88 supplies electric current to the electrodes. A flow of gas may be admitted to furnace 80 via inlet 90. Gases emitted in the various carbide-forming reactions and from pyrolysis of carbon-containing materials, along with any gases admitted to the furnace may be discharged via outlet 92.

Figure 3:
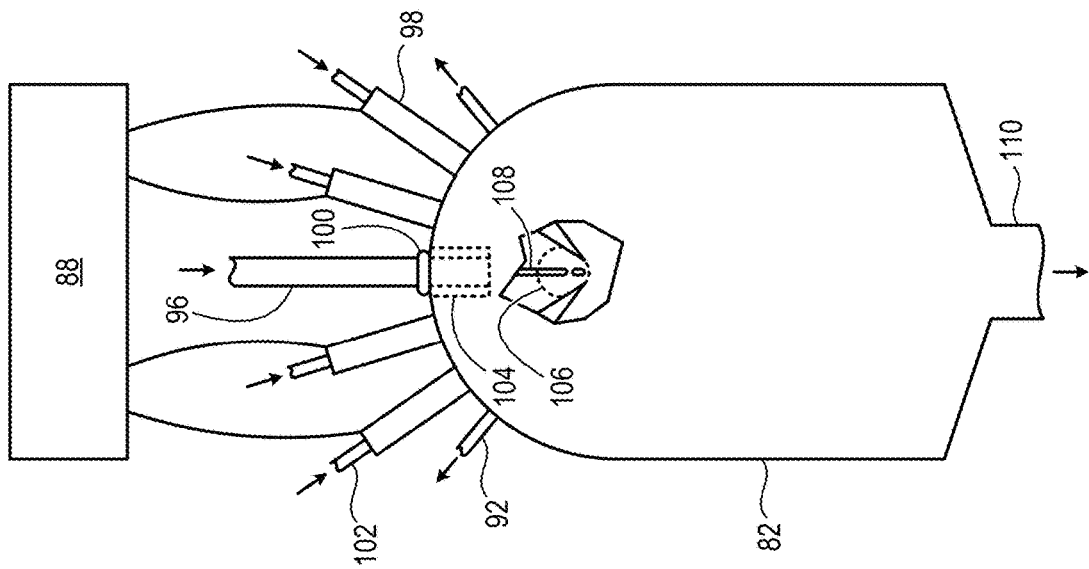
FIG. 3 shows aspects of an example plasma-arc furnace.

FIG. 3 shows aspects of another electric-arc furnace 94. Furnace 94 is a plasma-arc furnace. Furnace 94 includes a thru-hole for admitting feedstock material 96 and a plurality of plasma torches 98. Sealing band 100 surrounds the thru-hole. The number of plasma torches arranged in furnace 94 is not particularly limited. In some examples, a plasma-arc furnace may include three plasma torches; in some examples, a plasma-arc furnace may include six plasma torches. In some examples, each plasma torch 98 includes a conduit 102 through which a gas—e.g., helium, argon and/or hydrogen—is conducted to a nozzle positioned inside the furnace vessel. In some examples, each plasma torch includes a consumable cylindrical graphite electrode that can be used to ignite the plasma. In some examples, each plasma torch includes an inductive heating element configured to sustain the plasma after ignition. In some examples the position of each plasma torch (e.g., the extension into the interior of the furnace vessel) can be varied independently. In some examples the orientation of each plasma torch within the furnace vessel can be varied independently. In some examples each plasma torch may be configured to swivel and/or rotate. Together with independent heating of each plasma torch via the respective inductive heating elements, control of the position and orientation of the plasma torches enables efficient, uniform pyrolysis of feedstock material 96.

In the illustrated example, furnace 94 includes preheater 104, which is configured to urge the temperature of feedstock material 96 closer to the temperature of the plasma and thereby avoid excessive cooling of the plasma by ingress of the feedstock material. In some examples the preheater heats and merely softens the feedstock material, which remains solid as it encounters electric arc 106. In other examples, as illustrated, the preheater melts the feedstock material into a liquid stream 108 and/or droplets. In these and other examples, preheated feedstock material is introduced to the hottest part of electric arc 106. In arc furnace 94 the solidified product falls into the body of the furnace and is pneumatically conveyed to a cyclone 110, which separates the product from the carrier gas. In some examples, a shield may be added to the blended plastic rod being introduced, or to the melted, blended plastic being injected into the apex plume.

The general configuration of FIG. 3 admits of numerous variants. In some examples, to avoid carbon buildup on plasma torches 98, feedstock material 96 may be introduced within a conduit which is surrounded by a stream of gas, such as hydrogen. In some examples the gas may funnel a molten jet of the feedstock material to the hottest part of electric arc 106, or, impart Venturi-like suction within the apex area, to draw out liquefying gases and facilitate fluidized flow of the calcium oxide into the apex plume. Without tying this disclosure to any particular theory, it is possible that forced mass transport of this kind may increase reaction efficiency. In some examples and scenarios, the gas released when melting the feedstock material forces the not-yet-liquefied plastic through the increasingly hot conduit and toward the plasma apex.

III

Returning now to the discussion in part I above, the N-type fertilizer herein can be derived from any suitable cyanamide compound, such as cyanamide itself, its dimer 2-CG, melamine, or any suitable mixture thereof. Under appropriate conditions, cyanamide compounds undergo hydrolysis, forming equilibrium mixtures comprising ammonium carbamate. Illustrating for 2-CG, $$(NH_2)_2(CN)_2 + 4H_2O \rightarrow 2NH_4^+ + 2H_2NCO_2^-. \tag{14}$$
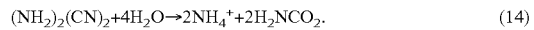

The term 'comprising' is used above because the actual speciation of aqueous ammonium carbamate is complex and condition-dependent, the carbamate anion readily hydrolyzing into ammonia, bicarbonate and carbonate, $$H_2NCO_2^- + H_2O \leftrightarrows NH_3 + HCO_3^- \leftrightarrows NH_4^+ + CO_3^{2-}. \tag{15}$$
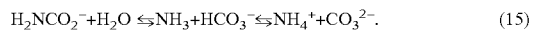

The term 'aqueous cyanamide hydrolysate' (ACH) refers herein to an aqueous solution or slurry which is the hydrolysis product of one or more cyanamide compounds. ACH is the spreadable form of the fertilizer herein. When the ACH is applied to soil, at least some of its fixed nitrogen content is available immediately, for aqueous ammonium cations (from eqs 14 and 15) freely exchange into the soil. Additional fixed nitrogen becomes available as $NH_3$ outgases from the ACH, based on eq 15 and on the thermal decomposition of ammonium bicarbonate, $$NH_4^+ + HCO_3^- \rightarrow NH_3 + CO_2 + H_2O; \tag{16}$$
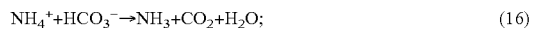

ammonium carbonate, $$2NH_4^+ + CO_3^{2-} \rightarrow 2NH_3 + CO_2 + H_2O; \tag{17}$$
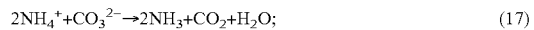

and ammonium carbamate, $$NH_4^+ + H_2NCO_2^- \rightarrow 2NH_3 + CO_2. \tag{18}$$

Finally, at least some of the fixed nitrogen content of the ACH may dwell in the soil in the form of $NH_4^+$ and $H_2NCO_2^-$ anions, until released thermally via eqs 15-18. Overall a very high efficiency of physicochemical transfer of the fixed nitrogen content to the soil is expected from this mixture.

Figure 4:
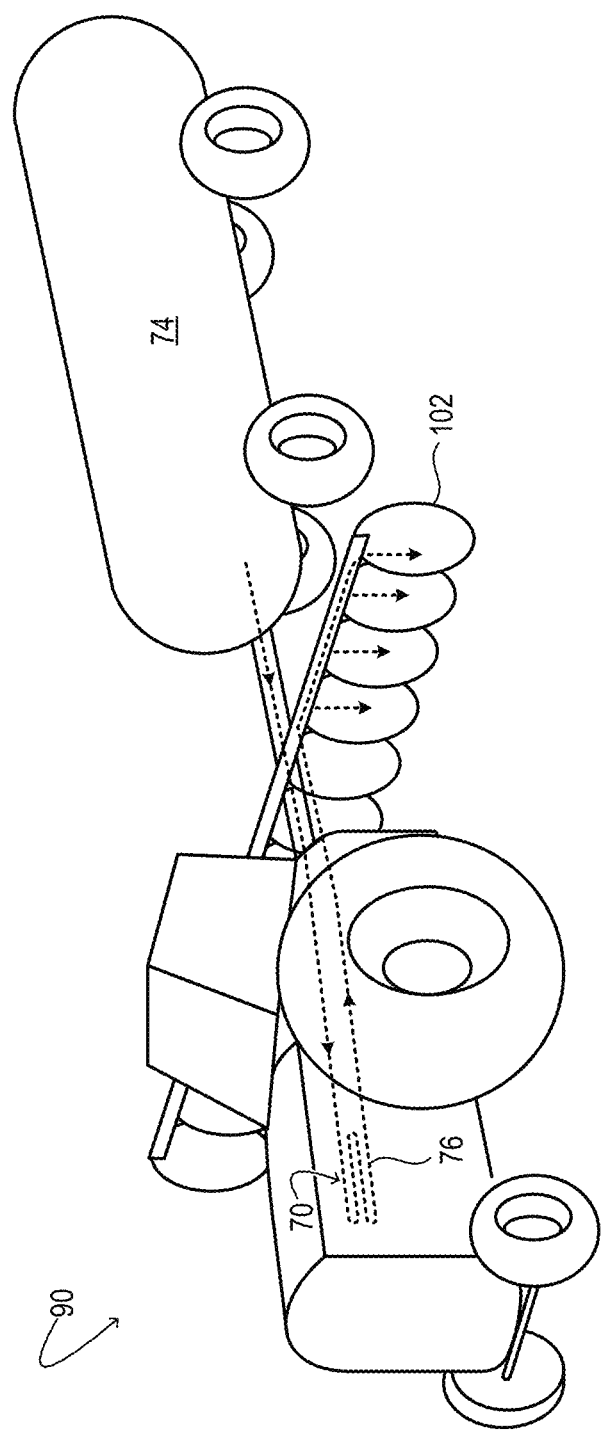
FIG. 4 shows aspects of mobile farm equipment comprising a hydrolyser for converting one or more cyanamide compounds into an ammonium carbamate hydrolysate.

In some examples the one or more cyanamide compounds that go to forming the ACH may be hydrolyzed using heat generated by mobile farm equipment, as shown in FIG. 4. Thus, a hydrolyser 70 may be arranged in mobile farm equipment 90, wherein the ACH may be conducted to blades 92 or otherwise spread onto (or into) the soil. In some examples activities such as tilling and plowing may be enacted together with application of the ACH—i.e., concurrently in the same pass over the soil. In some examples the heat used for the hydrolysis may be drawn from the farm equipment. In more particular examples heat for the hydrolysis may comprise recovered exhaust heat. In some, non-limiting examples, hydrolysis (e.g., eq 14) is enacted at a temperature or range of temperatures between 100 and 300 degrees Celsius. Hydrolysis temperatures greater than 300 degrees may also be used. In some examples hydrolysis may be accelerated via a suitable catalyst, and lower temperatures may be used. In one non-limiting example, a vanadium pentoxide/zinc catalyst may be used to accelerate the hydrolysis.

IV

Figure 5:
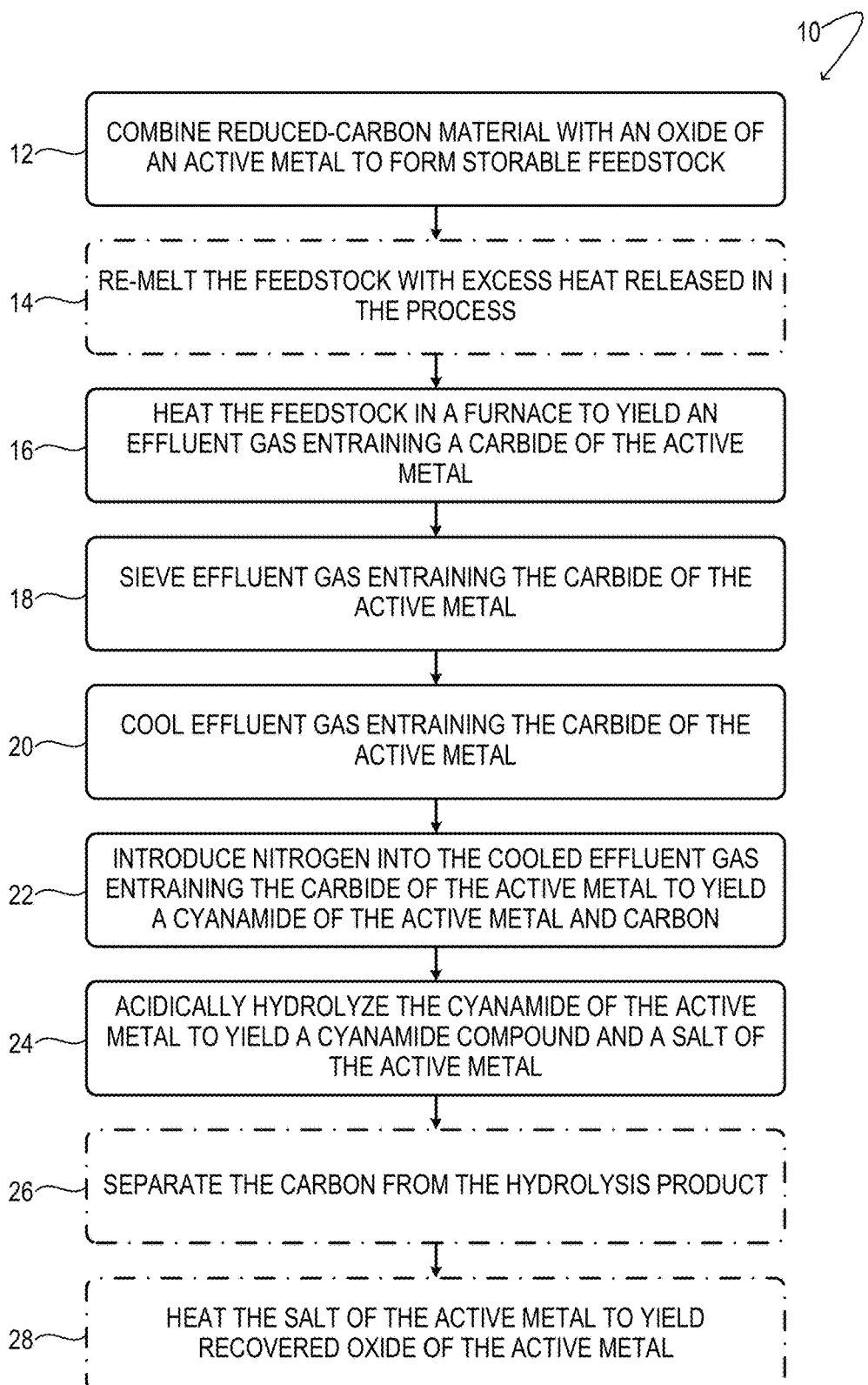
FIG. 5 shows aspects of an example process to make a cyanamide compound.

FIG. 5 shows aspects of an example process 10 for making one or more cyanamide compounds. At 12 of process 10, reduced-carbon material is combined with an oxide of an active metal to form a storable feedstock for high-temperature processing. As used herein, a 'reduced-carbon material' is any material comprising carbon in an oxidation state less than or equal to zero. The skilled reader is reminded that the oxidation-state formalism assigns an oxidation state of +1 to hydrogen when bonded to a more electronegative atom, assigns an oxidation state of −2 to oxygen when bonded to a less electronegative atom, and assigns an oxidation state of zero to every atom in an elemental state. Accordingly, carbohydrates and elemental carbon both qualify as reduced-carbon material because the carbon therein has an oxidation state of zero. Non-limiting examples of reduced-carbon material include coke, coal, and charable material such as biomass, waste plastic, roof shingle, and motor-vehicle tires. In examples in which the reduced-carbon material comprises biomass, the biomass may include plant and animal products of all kinds, including waste products. One form of charable organic material of particular interest, due to its great abundance and high content of hydrogen, is lignin derived from the paper industry.

In some examples, hydrocarbon gas may be a source of the reduced-carbon material, at least in part. For instance, hydrocarbon gas may be processed under controlled conditions to yield carbon monoxide, and the carbon monoxide may be disproportionated downstream of the oxidation to yield elemental carbon via the Boudouard reaction, $$2CO \rightarrow C + CO_2. \tag{19}$$

Suitable conditions for forming carbon monoxide from hydrocarbon gas include steam reforming and/or aerobic oxidation. In these and other examples, the Bosch reaction may be used to provide elemental carbon from $CO_2$, using hydrogen as a reductant, $$CO_2 + 2H_2 \rightarrow C + 2H_2O. \tag{20}$$

Similarly, the Sabatier process may be used to convert $CO_2$ into reduced carbon, again using hydrogen as a reductant, $$CO_2 + 4H_2 \rightarrow CH_4 + 2H_2O. \tag{21}$$

In some examples, the hydrogen input for any of the above processes may be electrolytically derived or captured from the discharge of a plasma/arc reactor, as noted hereinafter.

The term 'active metal' refers generically to metallic elements of groups IA and IIA of the Periodic Table of the Elements. In more particular examples, this term is restricted to relatively abundant and toxicologically and environmentally benign elements from groups IA and IIA—such as sodium, potassium, magnesium, and calcium. In some examples, accordingly, the oxide of the active metal includes CaO. In some examples, the oxide of the active metal includes sodium oxide ($Na_2O$). In some examples, the oxide of the active metal may include a mixture of oxides of different active metals.

As noted above, the reduced-carbon material in some examples may include waste plastic. Non-limiting examples of waste plastic include polypropylene (PP), polyethylene (PE), polystyrene, polyethylene terephthalate (PET), nylon, polyvinylchloride (PVC), acrylonitrile butadiene styrene (ABC), poly(methyl methacrylate) (PMMA), polycarbonate (PC), and polytetrafluoroethylene (PTFE). More generally, waste plastic may include any commonly used thermoplastic polymer or copolymer material or mixture thereof. In some examples, the thermoplastic polymer or copolymer material may be combined with thermosetting and/or cross-linked polymer materials and/or non-polymeric plasticizers. Alternatively or in addition, the reduced-carbon material may include non-plastic components, such as roof shingle and/or motor-vehicle tires.

The reduced-carbon material may be combined with the oxide of the active metal in any suitable manner. The reduced-carbon material may be conducted through a chipper and therein chipped to a desirable particle size distribution prior to combination with the oxide of the active metal, for instance. In other examples, the reduced-carbon material may be shredded or otherwise broken into fragments of suitable size. Active-metal oxide that is crushed, ground, and/or sieved to a suitable particle size may be combined with the fragmented reduced-carbon material at controlled proportions required for subsequent reaction of the feedstock.

In some examples, the reduced-carbon material may be heated to a melting or softening temperature before or during blending with the active metal oxide. The mixture of the reduced-carbon material and the active-metal oxide then may be extruded. In some examples, the extrusion process itself may release heat sufficient to soften the reduced-carbon material. By this or any other suitable encapsulation mechanism, the active-metal oxide is encapsulated in the reduced-carbon material, in the extruded material. Extrusions of feedstock comprising controlled proportions of blended reduced-carbon material and active-metal oxide may be cut or otherwise segmented to any desired length and stored until needed.

Storage of the active-metal oxide encapsulated in the reduced-carbon material admits of several advantages. First, encapsulation in reduced-carbon material may protect the active-metal oxide from ambient water vapor and carbon dioxide, especially if the reduced-carbon material is hydrophobic. The term 'hydrophobic' is applied herein to any material that is substantially water-repellant, water-insoluble and/or non-water-absorbing. Non-limiting examples of hydrophobic materials include waste plastic, roof shingle, and motor-vehicle tires. Without benefit of the encapsulation, exposure of an active-metal oxide to atmospheric constituents is liable to degrade the material to the corresponding hydroxide—e.g., $$CaO + H_2O \rightarrow Ca(OH)_2, \tag{22}$$

and/or carbonate, $$CaO + CO_2 \rightarrow CaCO_3. \tag{23}$$

Second, encapsulation enables the active-metal oxide to be stored in a more environmentally responsible manner, as stored, encapsulated oxide material is less likely than non-encapsulated oxide material to be washed into a waterway in the event of excessive rainfall or flooding.

Third, the encapsulated material can be stored with the desired proportion of the active-metal oxide to the reduced-carbon material 'locked in' for subsequent reaction. This feature is valuable because process 10 may be engineered to consume various different active-metal oxides and various different forms of reduced-carbon material, even in the same production run. However, the optimal proportion of active-metal oxide to reduced-carbon material may vary depending on the forms being combined. Therefore, storage of the constituents already blended at the correct proportion and encapsulated alleviates the need for precise, variable metering of the constituents as they enter the feedstock-reactor system (vide infra).

In process 10, the carbon content of the reduced-carbon material is extracted and incorporated into a usable product. Accordingly, the feedstock need not include any source of carbon apart from the reduced-carbon material itself. In some examples, however, the overall conversion efficiency of process 10 may be improved by addition of elemental carbon to the feedstock. More particularly, the feedstock may include elemental carbon formed as a by-product of formation of the cyanamide intermediate and subsequently separated from the product, as described further below. The elemental carbon may be included in the blending and extrusion operations noted above. In examples in which elemental carbon is included in the feedstock, the proportion of reduced-carbon material relative to active-metal oxide may be reduced to account for stoichiometric reaction of the elemental carbon with the active-metal oxide.

Subsequently in process 10, the feedstock is conveyed into a furnace for high-temperature processing. Generally speaking, the feedstock may be conveyed in any suitable form. The feedstock may be augured in solid form, for instance. Conveyance in softened solid, semisolid, and liquid forms is also envisaged. In some examples, the feedstock may be conveyed in the form of droplets or a continuous stream. At 14, accordingly, the feedstock is optionally re-melted with excess heat released in process 10, to facilitate conveyance into the furnace as a softened solid, semisolid, or liquid. The excess heat used to re-melt the feedstock may comprise heat recovered from cyanamide synthesis, from effluent-gas cooling, or from another point in the process (vide infra).

At 16 of process 10, the feedstock is heated in a furnace to yield an effluent gas entraining a carbide of the active metal. In a typical example, the feedstock is pre-heated in a chamber maintained at a relatively high pressure $P_1$. The feedstock may be heated to any temperature or range of temperatures suitable to pre-condition the feedstock for subsequent high-temperature heating. In one non-limiting example, the feedstock may be pre-heated to about 1300° C. The subsequent high-temperature heating may be enacted within an electric-arc furnace, although other furnace types are also envisaged. In some examples, an electric-arc furnace or other high-temperature heating stage may reach a temperature of about 2200° C. In examples in which the oxide of the active metal comprises calcium oxide, the reaction yields calcium carbide,

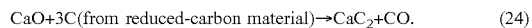

$$CaO+3C(\text{from reduced-carbon material}) \rightarrow CaC_2+CO. \quad (24)$$

Other active-metal carbides, such as magnesium carbide, may be formed in the same manner.

Some reduced-carbon materials, such as waste plastics, include chlorinated and/or fluorinated polymers. Without tying this disclosure to any particular theory, it is believed that the halogen component of the feedstock will associate with the active metal under the aggressive thermal conditions of eq 24, forming halide salts of the active metal—e.g., $CaCl_2$, $CaF_2$. This reaction pathway has been proposed in reported carbide synthesis using waste plastic in the feedstock. This provides at least the advantage of averting fluorinated and/or chlorinated hydrocarbon emission from the process. Moreover, $CaCl_2$ (and by inference $CaF_2$) is known to act as a flux for certain biphasic reactions—e.g., the reaction of $CaC_2$ with $N_2$, to form calcium cyanamide. Accordingly, the presence of a $CaCl_2$ and/or $CaF_2$ impurity in the $CaC_2$ may provide an additional advantage in scenarios in which the reduced-carbon material includes chlorinated and/or fluorinated waste plastic.

In examples in which the feedstock is heated in an electric-arc furnace, the furnace may be ignited from an initial cold state by initiating an arc discharge through the gas within the furnace. Once the electric-arc furnace is in operation, gas released by the decomposition of the reduced-carbon material and/or admitted as carrier gas (vide infra) will serve to sustain the arc. Such gas may include hydrogen, although various other arc-sustaining gasses are also envisaged. In some scenarios, accordingly, a portion of the effluent gas may be retained in the furnace to improve arc-heating efficiency.

In these and other examples, the feedstock may be heated under a flow of carrier gas admitted either to the furnace or fluidically upstream of the furnace. In examples in which a carrier gas is employed, the effluent gas that emerges from the furnace entraining the active-metal carbide includes the carrier gas. The carrier gas may be any gas that does not react with the active-metal oxide reactant or with the active-metal carbide intermediate at the operating temperatures of the furnace. In some examples, the carrier gas includes one or more of the inert gasses helium and argon. Alternatively or in addition, the carrier gas may include one or more of hydrogen and carbon dioxide, for instance.

In some examples, the rate of introduction of the carrier gas is controlled so as to influence the reaction kinetics of one or more stages of process 10. Such stages may include active-metal carbide formation at 16 and/or subsequent reaction of the active-metal carbide intermediate (vide infra). Generally speaking, increasing dilution with carrier gas reduces the rate of active-metal carbide formation because it cools the furnace. However, dilution may reduce the particle size distribution of the active-metal carbide intermediate, which increases the rate of the subsequent heterogeneous reaction of the intermediate.

At optional step 18, the effluent gas is subjected to a sieving operation, wherein the particles of the entrained active-metal carbide intermediate are size-selected upon discharge from the furnace. More particularly, only particles of sufficiently small size may be permitted to exit the furnace, thereby excluding highly agglomerated particles that may be less reactive toward cyanamide formation. In some examples, particles less than 100 microns, more preferably less than 20 microns, may be selected.

At 20 the effluent gas entraining the carbide of the active metal is cooled. More particularly, the effluent gas is cooled to a temperature suitable for subsequent transformation of the active-metal carbide into the corresponding active-metal cyanamide. In some examples, the effluent gas is cooled to about 1000° C. In some examples, cooling of the effluent gas may be effected by separating a portion of the flow of the effluent gas, actively or passively cooling that portion, and then re-introducing the cooled portion into the balance of the flow. The separated flow may be cooled by flowing through an air- or water-cooled chamber, for instance, or by flowing through an active heat exchanger.

Alternatively or in addition, the effluent gas entraining the active-metal carbide may be cooled via expansion. In particular, the effluent gas entraining the active-metal carbide may be discharged from the furnace into a chamber of pressure $P_2$, which is lower than $P_1$. Such cooling yields the carbide of the active metal in a controlled particle-size distribution. The reader will note that because the particle size distribution of the active-metal carbide is a function of the flow rate (vide supra), it is therefore also a function of the pressure differential $P_1$-$P_2$.

Alternatively or in addition, the effluent gas entraining the active-metal carbide may be cooled by mixing with an endothermically decomposable gas. More particularly, an endothermically decomposable gas may be introduced into the flow of the effluent gas emerging from the furnace. Examples of suitable endothermically decomposable gasses include light hydrocarbons, such as methane, ethane, and propane, and mixtures thereof. At temperatures above 900° C., for example, $$CH_4 \rightarrow C + 2H_2 \qquad (25)$$

occurs spontaneously and absorbs significant heat. At lower temperatures, however, the reaction is non-spontaneous. Accordingly, introduction of one or more hydrocarbons, such as methane, is expected to cool the effluent gas entraining the active-metal carbide to temperatures appropriate for subsequent reaction, as described below.

At 22 nitrogen is introduced into the cooled effluent gas entraining the carbide of the active metal, to yield a cyanamide of the active metal and elemental carbon. In examples in which calcium carbide is entrained in the cooled effluent gas, the cyanamide product is calcium cyanamide, $$CaC_2 + N_2 \rightarrow CaCN_2 + C. \qquad (26)$$

eq 26 represents the Franck-Caro process for conversion of calcium carbide to calcium cyanamide. Analogous reactivity is expected for active metals besides calcium, that form acetylide-type carbides under the conditions of eq 24. An acetylide-type carbide is a carbide having a relatively short C—C bond length, which reacts spontaneously with water to form acetylene. Analogous reactivity may also be observed for active metals that form non-acetylide-type carbides, such as magnesium.

In some examples, nitrogen may be introduced to the effluent gas entraining the active-metal carbide in a fluidized-bed reactor, where the nitrogen and the effluent gas are passed through the granular active-metal carbide at a velocity high enough to suspend the solid in a pseudofluid state. In some examples, introducing nitrogen to the cooled effluent gas includes maintaining a positive (e.g., high-velocity) flow of the effluent gas to prevent backflow of the nitrogen into the furnace. This can be achieved by discharging the fluidized-bed reactor into a chamber of pressure $P_3$ that is lower than $P_2$. This strategy not only discourages the backflow of nitrogen into the furnace (which could result in the formation of an active-metal cyanide) but also enables additional cooling of the active metal cyanamide intermediate via further expansion of the effluent gas. In some examples, the gas at $P_3$ may cool by expansion to less than 900° C.

At 24 the cyanamide of the active metal (M) is acidically hydrolyzed to yield a cyanamide compound and a salt of the active metal—e.g., $$M_nCN_2 + 2H^+ \rightarrow NH_2CN + nM^{(3-n)+}, \qquad (27)$$

where $NH_2CN$ corresponds to the cyanamide monomer itself. In some examples, the cyanamide of the active metal may acidically hydrolyzed with water and carbon dioxide as the acid source. Under mildly basic conditions, cyanamide dimerizes into 2-cyanoguanidine, $$2NH_2CN \rightarrow (NH_2)_2(CN)_2, \qquad (28)$$

which, if desired, is rearranged thermally to form the cyclic trimer melamine, $$(NH_2)_2(CN)_2 \rightarrow (NH_2)_3C_3N_3. \qquad (29)$$

Accordingly, the cyanamide compound may include one or more of cyanamide monomer, 2-cyanoganadine, and melamine. Cyanamide compounds are useful as nitrogen-rich fertilizers and as precursors for chemical synthesis, including pharmaceutical syntheses. Cyanamide compounds may also be used as fuels and as 'ammonia carriers'—i.e., storable, transportable substances that are controllably decomposable to yield ammonia. Over a vanadium pentoxide/zinc catalyst, for example, $$(NH_2)_2(CN)_2 + 4H_2O \rightarrow 2CO_2 + 4NH_3. \qquad (30)$$

In examples in which calcium cyanamide is acidically hydrolyzed with water and carbon dioxide as the acid source, the by-product of the hydrolysis includes one or more of calcium carbonate and calcium bicarbonate as salts of the active metal—e.g., $$CaCN_2 + H_2O + CO_2 \rightarrow NH_2CN + CaCO_3, \qquad (31)$$

depending on the pH. The term 'salt' refers herein to an ensemble of oppositely charged ions, whether arranged in solid form or dissociated in fluid solution. In that context, the reader will understand that bicarbonate ($HCO_3^-$) salts of some elements (e.g., sodium) are stable as solids and in solution, whereas $HCO_3^-$ salts of other elements (e.g., calcium) may be stable only in solution. Accordingly, 'calcium bicarbonate' refers herein to a dissolved material comprising $Ca^{2+}$ and $HCO_3^-$ in a 1:2 ratio.

The transformation in eq 31 can be conducted in an aqueous slurry, from which the elemental carbon by-product of the cyanamide synthesis of eq 26 may be separated. At 26 of process 10, accordingly, the elemental carbon by-product cyanamide synthesis is optionally separated from a product of hydrolysis of the calcium cyanamide. In some examples, the separated elemental carbon may be used in the feedstock, as noted hereinabove. In other examples, the separated elemental carbon may be combusted to generate heat for one or more stages of process 10.

Despite the advantages of separating the elemental carbon by-product, the elemental carbon alternatively may be used without separation from the hydrolysis products. For instance, unseparated elemental carbon and calcium carbonate and/or calcium bicarbonate may be dried and subjected to combustion conditions. In this manner, the one or more of the calcium carbonate and the calcium bicarbonate may be heated by combustion of the elemental carbon.

At 28 the salt of the active metal, which is a product of the hydrolysis, is heated to yield a recovered oxide of the active metal. For instance the one or more of the calcium carbonate and the calcium bicarbonate may be heated to yield recovered calcium oxide—e.g., $$CaCO_3 \rightarrow CaO + CO_2, \text{ or} \qquad (32)$$

$$Ca(HCO_3)_2 \rightarrow CaO + H_2O + 2CO_2. \qquad (33)$$

In some examples, the heating may be used to dry these salts prior to thermolysis. In some examples, accordingly, the active metal oxide used in 12 above may include an active metal oxide, such as calcium oxide, recovered in this manner. Recovery of CaO by thermolysis, as in eqs 32 and 33, is less expensive and more environmentally sustainable than repeated thermolysis of natural limestone, which may release toxins such as mercury and/or arsenic. Furthermore, the carbon dioxide released in eqs 32 and 33 may also be recaptured. Accordingly, in examples in which the acid hydrolysis at 24 employs carbon dioxide, the carbon dioxide may include recaptured carbon dioxide released by heating the one or more of the calcium carbonate and the calcium bicarbonate.

In some examples, the heat used to recover the oxide of the active metal may include reclaimed heat. eq 26, for instance, is known to be a significantly exothermic reaction. Thus, the heat used to recover the oxide of the active metal may include heat reclaimed from introducing nitrogen to the cooled effluent gas entraining the active-metal carbide, such as calcium carbide. In other examples, the reclaimed heat may derive from the cooling of the effluent gas.

In other examples, heat used to recover the oxide of the active metal may derive from external combustion. In example in which the elemental carbon by-product is separated at 26, the elemental carbon may be combusted externally as a heat source for recovery of the oxide of the active metal. In other examples, the CO effluent gas can be combusted to yield such heat.

No aspect of the above process should be interpreted in a limiting sense, because numerous variations, extensions, and omissions are also envisaged. For example, as the effluent gas that carries the active-metal carbide intermediate includes CO (from eq 24), process 10 may further comprise passing the effluent gas over a water-gas shift catalyst, to yield hydrogen,

$$CO + H_2O \rightarrow CO_2 + H_2. \quad (34)$$

In variants in which an endothermically decomposable gas (e.g., methane) is used at 20 to effect cooling of the effluent gas, and wherein a portion of the endothermically decomposable gas is still present after formation of the active-metal cyanamide, that portion may be subject to cracking conditions prior to passing the effluent gas over the water-gas shift catalyst. In other words, high-temperature cracking enacted at 20, fluidically downstream of carbide formation, may be supplemented by additional low-temperature and/or catalytic cracking downstream of cyanamide formation, to yield additional hydrogen. Cracking may be supported by resistive heating of the effluent gas, for instance. In more particular examples, the fluidized carbon formed by such cracking may treated with high-temperature steam to yield carbon monoxide and hydrogen,

$$C + H_2O \rightarrow CO + H_2, \quad (35)$$

fluidically upstream of the water-gas shift reaction.

The mode of utilization of the hydrogen prepared in eqs 34 and 35 is not particularly limited. In some examples, the hydrogen may be included in the stream of carrier gas supplied at 16 of method 10. Incorporation of hydrogen into the carrier gas may be more desirable than incorporation of methane itself, which may contain impurities that introduce undesirable process variables. In other examples, the hydrogen may be converted to heat or electrical energy for carbide formation at 16 or elsewhere in process 10.

Furthermore, reclaimed heat or heat derived from combustion of the elemental-carbon by-product or any combustible component of the effluent gas, such as hydrogen, may be used not only to recover the oxide of the active metal, but, alternatively or in addition, to re-melt the feedstock at 14 of process 10.

Figure 6:
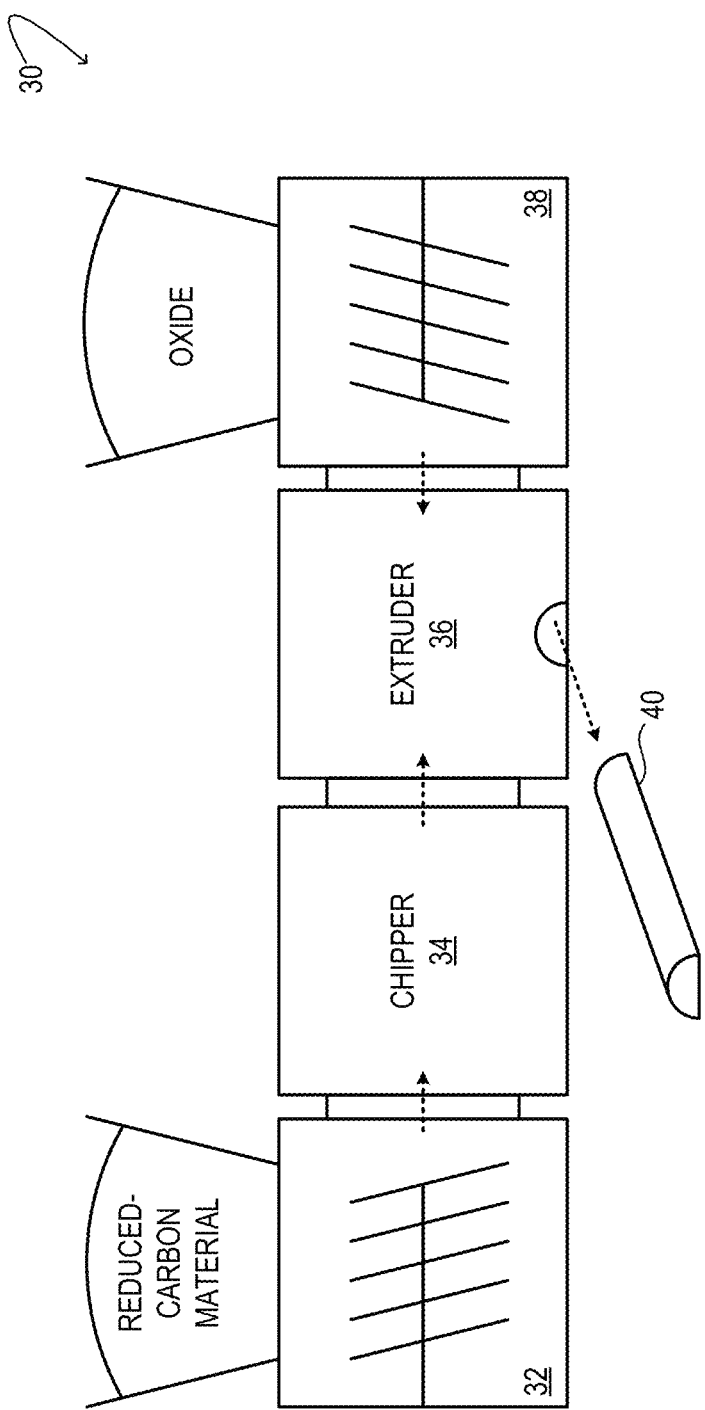
FIG. 6 shows aspects of an example feedstock-preparation system in connection to the process of FIG. 5.

FIG. 6 shows aspects of an example feedstock-preparation system 30 that may be used in connection to process 10. The feedstock-preparation system includes a hopper 32 and a chipper 34. The hopper is configured to receive reduced-carbon material and to convey the reduced-carbon material to the chipper. The chipper is configured to chip the reduced-carbon material into particles of a desired particle-size distribution.

Feedstock-preparation system 30 also includes an extruder 36 and an active-metal-oxide hopper 38. The extruder is configured to receive the chipped reduced-carbon material from chipper 34 and to receive active-metal oxide from the active-metal-oxide hopper. The extruder is configured to mechanically combine and intimately blend the chipped reduced-carbon material and the active metal oxide and to force the blended mixture through an orifice to form an extrusion 40 of active-metal oxide encapsulated in reduced-carbon material, which is suitable for use as a feedstock in process 10. In some examples, the extruder may be configured also to receive elemental carbon for incorporation into the feedstock.

Figure 7A:
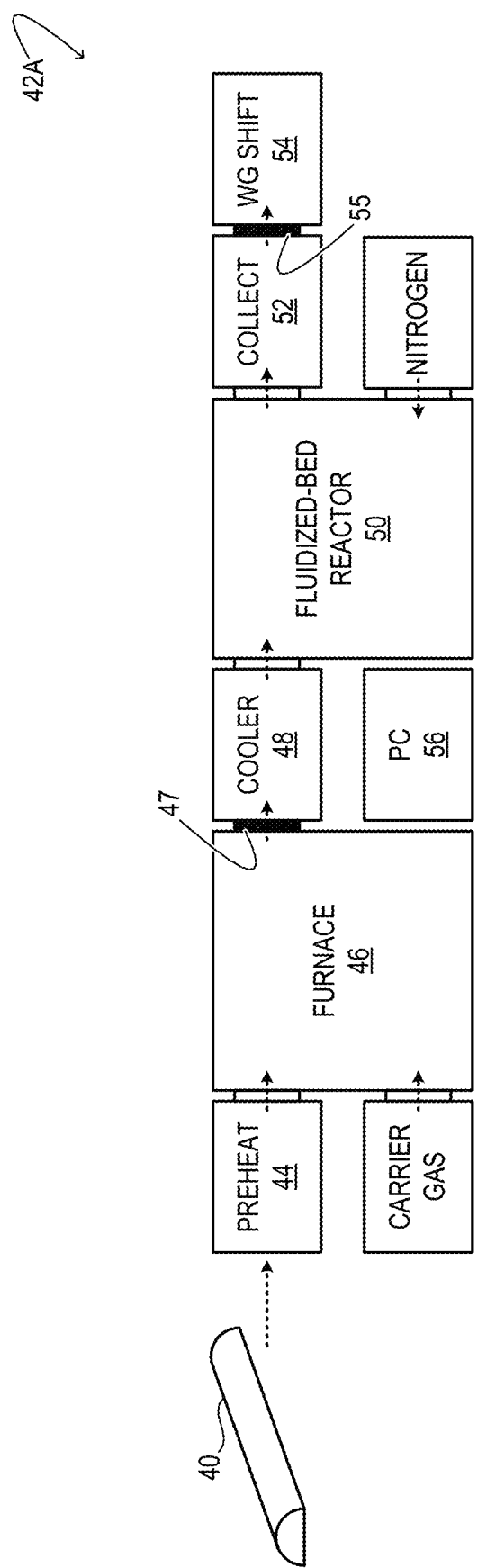
FIGS. 7A and 7B show aspects of example feedstock-reactor systems in connection to the process of FIG. 5.

FIG. 7A shows aspects of an example feedstock-reactor system 42A that may be used in connection to process 10. The feedstock-reactor system includes pre-heater 44 and a furnace 46. The pre-heater is configured to receive feedstock material and to pre-heat the feedstock material to a temperature suitable for entry into the furnace. The furnace is configured to receive pre-heated feedstock material from the pre-heater together with the carrier gas used in process 10. The furnace is configured to heat the pre-heated feedstock material and the carrier gas to a temperature at which eq 24 occurs with favorable kinetics. In some examples, the furnace may comprise an electric-arc furnace. In more particular examples, the furnace may comprise a rotating arc and/or hollow-electrode electric-arc furnace. In the illustrated example, a size-exclusion sieve 47 is arranged fluidically downstream of the furnace.

Feedstock-reactor system 42A also includes an optional cooler 48 and fluidized-bed reactor 50. Furnace 46 is configured to discharge the effluent gas entraining the active-metal carbide to cooler 48. In some examples, the effluent gas may be discharged through a sieve that achieves size selection of the entrained particles of the active-metal carbide. The cooler is configured to cool the effluent gas entraining the active-metal carbide and to discharge the cooled effluent gas entraining the active metal carbide to the fluidized-bed reactor. In some examples, the cooler is configured to introduce an endothermically decomposable gas into the effluent gas flow. The fluidized-bed reactor is configured to receive the cooled effluent gas entraining the active-metal carbide, to receive also nitrogen, and to facilitate reaction of the nitrogen and the active-metal carbide to form fluidized active-metal cyanamide particles.

Feedstock-reactor system 42A also includes a collection chamber 52 and, optionally, a water-gas shift reactor 54. Fluidized-bed reactor 50 is configured to discharge the effluent gas entraining the active-metal cyanamide to the collection chamber. In the illustrated example, the collection chamber includes a filter 55 or other separation component configured to pass the effluent gas on to the water-gas shift reactor but to retain the active-metal cyanamide. The water-gas shift reactor is configured to convert the CO component of the effluent gas to $H_2$ (eq 34). In some examples, optional cracking and/or producer-gas forming stages are arranged within or fluidically upstream of the water-gas shift reactor.

Feedstock-reactor system 42A also includes a process controller 56. The process controller is configured to receive sensory input from a plurality of sensors arranged in the feedstock-reactor system. Such sensors may include temperature sensors, pressure sensors, flow sensors, fill sensors, and the like. The sensors may be arranged on preheater 44, furnace 46, cooler 48, fluidized-bed reactor 50, collection chamber 52 and/or water-gas shift reactor 54, for example. The process controller is configured to provide control output to a plurality of actuators arranged in the feedstock-reactor system. Such actuators may include flow actuators that control the flow of carrier gas and/or nitrogen, or the flow between fluidically connected components of the feedstock-reactor system. Other actuators may include heating actuators for preheater 44, furnace 46, fluidized-bed reactor 50, and/or water-gas shift reactor 54, and cooling actuators for cooler 48, for example. Process controller 56 includes a computer system configured to execute a process for controlling any, some, or all of the control outputs based on any, some, or all of the sensory inputs, and further based on desirable process setpoints and/or input from a human operator. In some examples, the process controller may be configured to control any, some, or all of the control outputs in a closed-loop manner, based on any, some, or all of the sensory inputs and/or process setpoints.

Figure 7B:
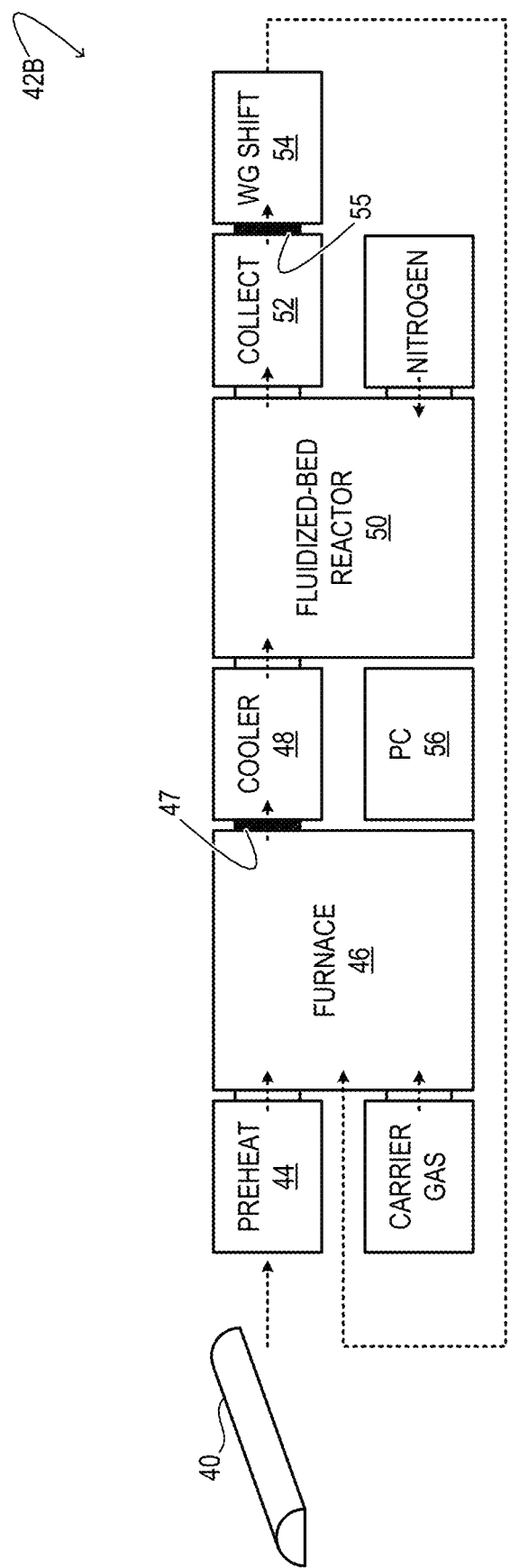

FIG. 7B shows aspects of another example feedstock-reactor system 42B that may be used in connection to process 10. In feedstock-reactor system 42B, a portion of the discharge from water-gas shift reactor 54 is fed back to furnace 46 to supplement the carrier gas admitted to the furnace. That portion may include hydrogen formed in the water-gas shift reactor and/or any non-reactive gas transmitted through the water-gas shift reactor.

Figure 8:
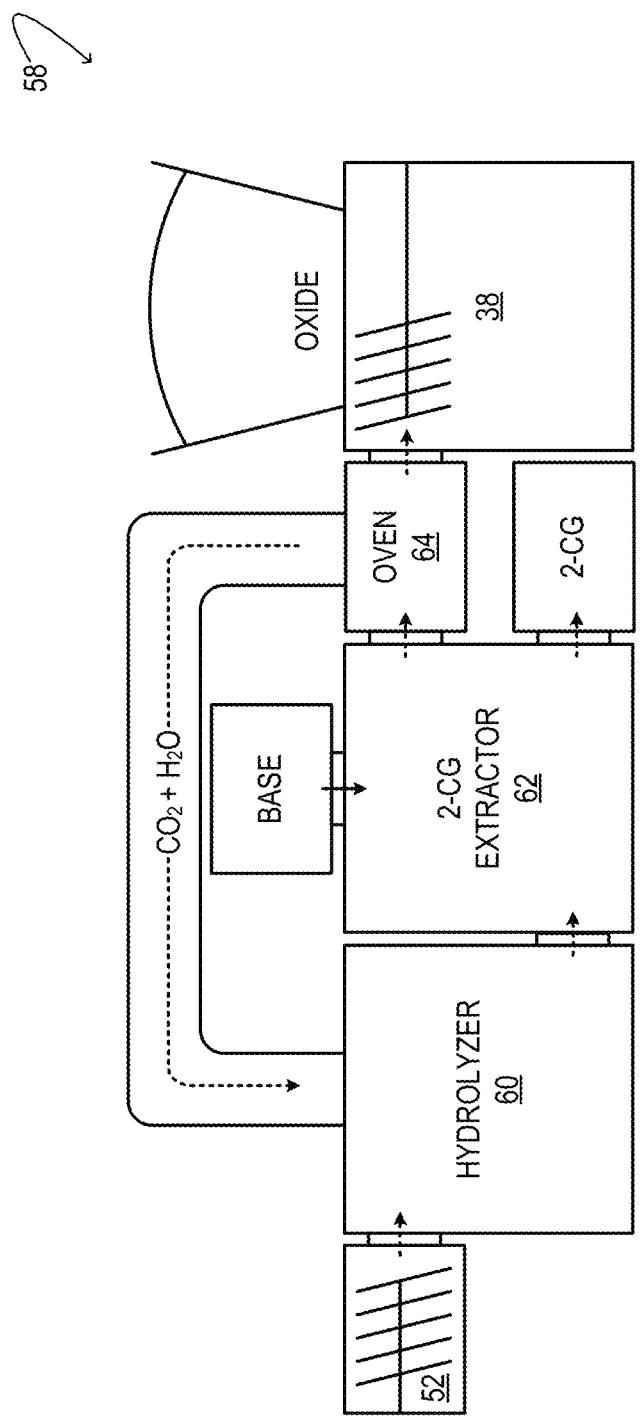
FIG. 8 shows aspects of an example cyanamide-reactor system in connection to the process of FIG. 5.

FIG. 8 shows aspects of an example cyanamide-reactor system 58 that may be used in connection to process 10. The cyanamide-reactor system includes hydrolyser 60 and 2-cyanoguanadine (2-CG) extractor 62. The hydrolyser is configured to receive the active-metal cyanamide from collection chamber 52 and to receive also an equimolar mixture of water and $CO_2$. The hydrolyser is configured to facilitate acidic hydrolysis of the active-metal cyanamide and to release the hydrolysate to the 2-CG extractor. To that end, the 2-CG extractor is configured to receive a base (as understood in the context of acid-base chemistry) and to combine the hydrolysate and the base, causing the cyanamide component of the hydrolysate to dimerize into 2-CG.

Cyanamide-reactor system 58 also includes oven 64. From 2-CG extractor 62, a carbonate and/or bicarbonate component of the hydrolysate is conveyed to the oven, which is configured to heat the carbonate and/or bicarbonate component to a temperature at which the thermolysis of eqs 32 and 33 is spontaneous. Gaseous products of the thermolysis, water vapor and $CO_2$ are conveyed back to hydrolyser 60, while the active-metal oxide component is conveyed to active-metal-oxide hopper 38.

No aspect of the process componentry should be understood in a limiting sense, because other forms of componentry may be used, alternatively or in addition, in connection to the processes, functions, and acts disclosed herein.

V

One aspect of this disclosure is directed to an energy-releasing process for making fertilizer by consumption of a charable, reduced carbon source. The process comprises: (a) combining the carbon source with an oxide of an active metal to form a feedstock for high-temperature processing; (b) heating the feedstock in a furnace to yield an effluent gas entraining a carbide of the active metal; (c) cooling the effluent gas entraining the carbide of the active metal; (d) introducing nitrogen into the cooled effluent gas entraining the carbide of the active metal, to yield a cyanamide of the active metal and elemental carbon; (e) acidically hydrolyzing the cyanamide of the active metal to yield a cyanamide compound and a salt of the active metal; and (f) processing the cyanamide compound to yield an N-type fertilizer.

In some examples the oxide of the active metal includes calcium oxide. In some examples acidically hydrolyzing includes hydrolyzing with water and carbon dioxide, and the salt of the active metal includes one or more of calcium carbonate and calcium bicarbonate. In some examples the cyanamide compound includes one or more of 2-cyanoguanidine and melamine. In some examples the carbon source comprises agricultural waste and/or forest biomass. In some examples the carbon source comprises carbohydrate. In some examples the carbon source comprises lignin. In some examples the carbon source comprises $(CH_2)_n$. In some examples the process further comprises extracting heat energy from the process. In some examples the process further comprises using at least some of the heat energy to obtain hydrogen from a hydrocarbon or other compound. In some examples the process further comprises extracting hydrogen from the effluent gas or from the cooled effluent gas. In some examples the process further comprises extracting carbon monoxide from the effluent gas or from the cooled effluent gas. In some examples the process further comprises disproportionating the carbon monoxide to make graphite. In some examples the process further comprises harvesting electrical energy via a fuel cell configured to oxidize hydrogen and/or carbon monoxide extracted from the effluent gas or from the cooled effluent gas. In some examples the cooled effluent gas comprises a mineral residue, the process further comprising returning the mineral residue to soil. In some examples the N-type fertilizer comprises urea. In some examples the N-type fertilizer comprises ammonia. In some examples the process further comprises oxidizing at least some of the ammonia to nitric acid. In some examples the process further comprises combining the nitric acid with phosphate rock in order to make a P-type fertilizer. In some examples the N-type fertilizer comprises one or more of ammonium carbamate and a hydrolysate of ammonium carbamate.

It will be understood that the configurations and/or approaches described herein are exemplary in nature, and that these specific examples are not to be considered in a limiting sense, because numerous variations are possible. The specific routines or methods described herein may represent one or more of any number of processing strategies. As such, various acts illustrated and/or described may be conducted in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The following additional documents are also hereby incorporated herein by reference for all purposes:

R. K. Graupner and J. D. Hultine, PRODUCTION AND USE OF CYANOGUANIDINE AND CYANAMIDE, International Patent Application Publication Number WO 2012/123378 A1, 20 Sep. 2012.

R. K. Graupner and J. D. Hultine, PRODUCTION AND USE OF CYANOGUANIDINE AND CYANAMIDE, International Patent Application Publication Number WO 2012/123380 A2, 20 Sep. 2012.

The invention claimed is:

1. An energy-releasing process for making fertilizer by consumption of a charable, reduced carbon source, the process comprising:

combining the carbon source with calcium oxide or magnesium oxide to form a feedstock for high-temperature processing;

heating the feedstock in a furnace to yield an effluent gas comprising carbon monoxide and entraining a calcium carbide or magnesium carbide;

subjecting the carbon monoxide to water-gas shift conditions to yield hydrogen and carbon dioxide;

introducing nitrogen into the calcium carbide or magnesium carbide, to yield calcium cyanamide or magnesium cyanamide, and elemental carbon;

exposing the calcium cyanamide or magnesium cyanamide, and the elemental carbon to carbonic acid to yield a cyanamide compound, calcium carbonate or magnesium carbonate, and the elemental carbon;

passing the carbon dioxide through the calcium carbonate or magnesium carbonate, and the elemental carbon to recover the calcium oxide or magnesium oxide, and yield additional carbon monoxide; and subjecting the additional carbon monoxide to water-gas shift conditions to yield additional hydrogen and additional carbon dioxide.

2. The process of claim 1 wherein the calcium oxide or magnesium oxide includes calcium oxide.

3. The process of claim 1 wherein the cyanamide compound includes one or more of 2-cyanoguanidine and melamine.

4. The process of claim 1 wherein the carbon source comprises agricultural waste and/or forest biomass.

5. The process of claim 1 wherein the carbon source comprises carbohydrate.

6. The process of claim 1 wherein the carbon source comprises lignin.

7. The process of claim 1 wherein the carbon source comprises $(CH_2)_n$.

8. The process of claim 1 further comprising extracting heat energy from the process.

9. The process of claim 8 further comprising using at least some of the heat energy to obtain still more hydrogen from a hydrocarbon.

10. The process of claim 1 further comprising extracting still more hydrogen from the effluent gas or from the cooled effluent gas.

11. The process of claim 1 further comprising disproportionating some of the carbon monoxide to make graphite.

12. The process of claim 1 further comprising harvesting electrical energy via a fuel cell configured to oxidize some of the carbon monoxide extracted from the effluent gas or from the cooled effluent gas.

13. An energy-releasing process for making fertilizer by consumption of a charable, reduced carbon source, the process comprising:

combining the carbon source with calcium oxide or magnesium oxide to form a feedstock for high-temperature processing;

heating the feedstock in a furnace to yield an effluent gas entraining a calcium carbide or magnesium carbide and further entraining a mineral residue;

cooling the effluent gas entraining the calcium carbide or magnesium carbide, and the mineral residue;

introducing nitrogen into the cooled effluent gas entraining the calcium carbide or magnesium carbide, and the mineral residue, to yield a calcium cyanamide or magnesium cyanamide, and elemental carbon;

acidically hydrolyzing the calcium cyanamide or magnesium cyanamide to yield a cyanamide compound and a calcium salt or magnesium salt;

processing the cyanamide compound to yield an N-type fertilizer comprising urea; and returning the mineral residue to soil.

14. The process of claim 13 wherein the N-type fertilizer further comprises ammonia.

15. The process of claim 13 wherein the N-type fertilizer further comprises a hydrolysate of ammonium carbamate.

16. An energy-releasing process for making fertilizer by consumption of a charable, reduced carbon source, the process comprising:

combining the carbon source with calcium oxide or magnesium oxide to form a feedstock for high-temperature processing;

heating the feedstock in a furnace to yield an effluent gas entraining a calcium carbide or magnesium carbide;

cooling the effluent gas entraining the calcium carbide or magnesium carbide;

introducing nitrogen into the cooled effluent gas entraining the calcium carbide or magnesium carbide, to yield a calcium cyanamide or magnesium cyanamide, and elemental carbon;

exposing the calcium cyanamide or magnesium cyanamide, and the elemental carbon to carbonic acid to yield a cyanamide compound, calcium carbonate or magnesium carbonate, and the elemental carbon;

processing the cyanamide compound to yield an N-type fertilizer; and exposing the calcium carbonate or magnesium carbonate, and the elemental carbon to additional carbonic acid to dissolve the calcium carbonate or magnesium carbonate and leave the elemental carbon undissolved, to effect separation of the elemental carbon.

* * * * *